United States Patent
Lu et al.

(10) Patent No.: US 9,208,297 B2
(45) Date of Patent: Dec. 8, 2015

(54) ONE TIME PASSWORD INQUIRY METHOD AND TOKEN

(75) Inventors: Zhou Lu, Beijing (CN); Hua Zhang Yu, Beijing (CN)

(73) Assignee: FEITIAN TECHNOLOGIES CO., LTD., Beijing (CN)

( * ) Notice: Subject to any disclaimer, the term of this patent is extended or adjusted under 35 U.S.C. 154(b) by 1135 days.

(21) Appl. No.: 12/346,010

(22) Filed: Dec. 30, 2008

(65) Prior Publication Data

US 2009/0193516 A1    Jul. 30, 2009

(30) Foreign Application Priority Data

Jan. 29, 2008 (CN) .......................... 2008 1 0057043

(51) Int. Cl.
  *G06F 7/04* (2006.01)
  *G06F 21/31* (2013.01)
(52) U.S. Cl.
  CPC ...................................... *G06F 21/31* (2013.01)
(58) Field of Classification Search
  USPC ................. 726/9, 20; 713/172–174
  See application file for complete search history.

(56) References Cited

U.S. PATENT DOCUMENTS

| | | | | |
|---|---|---|---|---|
| 8,132,243 B2* | 3/2012 | Bychkov | ............................. | 726/9 |
| 2005/0015588 A1* | 1/2005 | Lin et al. | ........................ | 713/159 |
| 2006/0041759 A1* | 2/2006 | Kaliski et al. | .................. | 713/184 |
| 2006/0213754 A1* | 9/2006 | Jarrett et al. | ................ | 200/43.01 |
| 2007/0133591 A1* | 6/2007 | Shatford | ........................ | 370/457 |
| 2007/0174904 A1* | 7/2007 | Park | ..................................... | 726/7 |
| 2008/0065892 A1* | 3/2008 | Bailey et al. | .................. | 713/171 |
| 2008/0077799 A1* | 3/2008 | Labaton | ......................... | 713/184 |
| 2008/0168544 A1* | 7/2008 | von Krogh | ......................... | 726/6 |

OTHER PUBLICATIONS

Hallsteinsen et al. "Using the mobile phone as a security token for unified authentication," Systems and Networks Communications, 2007. ICSNC 2007. Second International Conference on pp. 68-68.*
Wang et al. "An improved OTP system based on bidirectional virtual authorization in mobile commerce" Service Operations and Logistics, and Informatics, 2008. IEEE/SOLI 2008. IEEE International Conference on pp. 569-572.*

* cited by examiner

*Primary Examiner* — Roderick Tolentino
(74) *Attorney, Agent, or Firm* — Workman Nydegger

(57) ABSTRACT

The invention relates to a one time password inquiry method, including steps of triggering a one time password token, determining whether the trigger is a generation or an inquiry operation, if it is an inquiry operation, inquiring and displaying the latest generated password; otherwise, generating a one time password. Meanwhile, the invention also provides a one time password token with inquiry function, including a trigger module, a determining module, a one time password generating module, a storage module, a display module and an inquiry module. By adding inquiry function, the token meets the need for a user to inquiry a one time password, eliminates the asynchronous problem between the token and a server, and lowers power loss taken by the token.

9 Claims, 3 Drawing Sheets

ONE TIME PASSWORD INQUIRY METHOD AND TOKEN

This application claims priority to Chinese Patent Application No. 200810057043.8, entitled "One time password inquiry method and token" and filed with the Chinese Patent Office on Jan. 29, 2008, which is hereby incorporated by reference in its entirety.

FIELD OF THE INVENTION

The invention relates to information security field, in particular to a one time password inquiry method and token thereof.

BACKGROUND OF THE INVENTION

At present, more and more online crimes emerge, which is derived from shortcomings in authentication method. The authentication method of static password is commonly used so far, which means that data used in authentication is static, or the password in each authentication is constant. However, since the static password is easy to be intercepted by memory scanning or online listening, it is unsafe.

For recent years, the slow development in password technology and rapid development in decryption technology make a threat to the reliability of authenticating an account. On this demand, the authentication technology of dynamic password is developed. The dynamic password, also called one time password, is a relative name to the traditional static password, and it is changeable due to changes in factors for generating it, thereby eliminating the security threats made by a static password.

The one time password technology applies a special apparatus, called one time password token, which is equipped with a built-in power, a one time password generating chip and a screen. The one time password generating chip executes special algorithm for generating a one time password with the current time or number of times the token being used and displays the password on the screen. The present token is powered by batteries, this means that, the token must be disposed once power is shut-off, or the battery is changed or out of use.

For the present one time password token, there are three problems to be solved. The first is that a user may not remember a password generated just now by a button because duration for displaying the password is too short in order to save power. The second is that the present token is easy to be asynchronous with a server, this means that, if the token is mis-triggered by N times, the asynchronous times between the token and the server will increase by N times, therefore once the asynchronous number of times exceed the preset number of times in the server, the token will be out of use. The third is that if there is more time to display a password for a user to remember the password, more power loss will be taken in the token.

SUMMARY OF THE INVENTION

In order to meet needs for a user to inquiry a one time password, eliminate the asynchronous problem between a one time password token and a server, and lower power loss taken by the token, the invention discloses a one time password inquiry method and a token thereof.

A one time password inquiry method, includes steps of:
triggering a one time password token;
determining whether the trigger is an inquiry or a generation operation, if it is an inquiry operation, inquiring and displaying a one time password stored, otherwise, generating a one time password.

The step of inquiring and displaying the one time password stored includes inquiring the token, if there is not a one time password in the token, displaying error information; otherwise, displaying the one time password stored.

After the one time password is generated, the method further includes a step of displaying the password.

After the one time password is generated, the method further includes a step of storing the password.

The step of triggering the token is executed by a trigger means in the token.

The step of determining whether the trigger is an inquiry or a generation operation is executed according to a preset rule.

The preset rule is a duration or a frequency of the trigger.

The trigger means include two trigger means for generating a one time password and inquiring a one time password stored respectively.

The trigger means is a button, a key, a sensor or a switch.

The invention also discloses a one time password token with inquiry function, including a trigger module, a determining module, a one time password generating module, a storage module, a display module and an inquiry module;

the trigger module, the one time password generating module and the inquiry module are respectively connected to the determining module;

both the storage module and the display module are connected to the one time password module and the inquiry module;

the trigger module is for generating a trigger signal for enabling the determining module;

the determining module is for determining whether the trigger signal generated by the trigger module is a generation or an inquiry signal, if it is a generation signal, enabling the one time password generating module; otherwise, enabling the inquiry module;

the one time password generating module is for generating a one time password;

the storage module is for storing the one time password generated by the one time password generating module;

the display module is for displaying the one time password generated by the one time password generating module and the one time password inquired by the inquiry module;

the inquiry module is for inquiring the one time password in the storage module.

The invention also discloses a one time password token with inquiry function, including a trigger module, a determining module, a one time password generating module, a storage module, a display module, an inquiry module and a power supply module;

the trigger module, the one time password generating module and the inquiry module are respectively connected to the determining module;

both the storage module and the display module are connected to the one time password module and the inquiry module;

the trigger module is for generating a trigger signal for enabling the determining module;

the determining module is for determining whether the trigger signal generated by the trigger module is a generation or an inquiry signal, if it is a generation signal, enabling the one time password generating module; otherwise, enabling the inquiry module;

the one time password generating module is for generating a one time password;

the storage module is for storing the one time password generated by the one time password generating module;

the display module is for displaying the one time password generated by the one time password generating module and the one time password inquired by the inquiry module;

the inquiry module is for inquiring the one time password in the storage module;

the power supply module is for supplying power for the token.

The one time password token further includes a control module for controlling the display module to display error information when the inquiry module finds no one time password in the storage module.

The trigger module includes trigger means.

The determining module is for determining whether the trigger from the trigger means is a generation or an inquiry operation according to duration or frequency of the trigger.

The trigger module includes two trigger means, for generating a one time password and inquiring a one time password stored, respectively.

The trigger means is a key, a button, a sensor or a switch.

The display module is a display means, including a segment-code screen, a dot-matrix screen, a characters screen or an image screen.

The invention is of the following advantages: eliminating the problem of lacking inquiry function in the present token; reducing the possibility of a token being disposed due to asynchronous problem between the token and a server resulted from mis-triggering the token; lowering the power loss taken by the token efficiently, thereby increasing life span of the token.

DETAILED DESCRIPTION OF THE PREFERRED EMBODIMENTS

In order to make the purpose, technical solution and advantages clearer, a further description will be given in combination with the following figures and embodiments.

Embodiment 1

Figure 1:
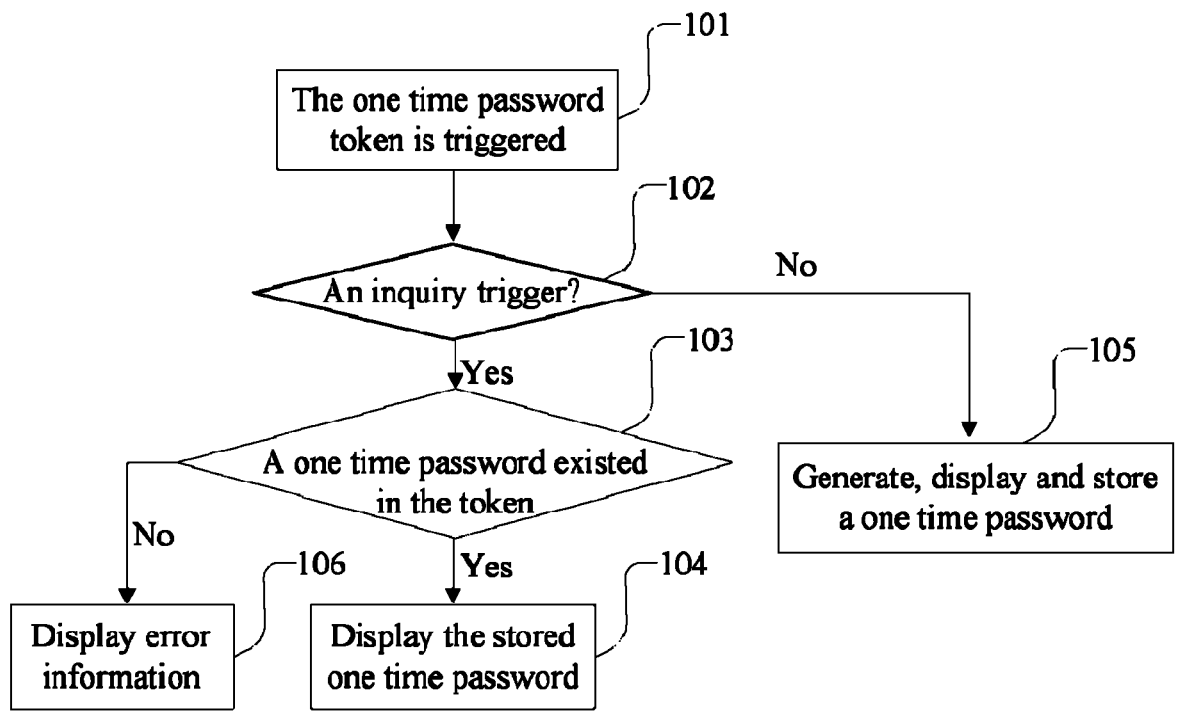
FIG. 1 is a flow chart of the one time password inquiry method of the invention.

As shown in FIG. 1, the embodiment 1 discloses a one time password inquiry method, including steps described below.

In step 101, a one time password token is triggered.

The trigger is executed by a trigger means which is a button, a key, a sensor or a switch.

In step 102, the one time password token determines whether the trigger is a generation or an inquiry operation, if it is a generation operation, go to step 105; otherwise, go to step 103.

There are two methods for determining the trigger as below.

One is that an additional trigger means is installed to trigger the inquiry directly.

Another is that an inherent trigger means in the token is used to trigger both the generation and inquiry operation, and the trigger type is determined by software executed in the token after the trigger.

The determining step can be executed according to duration or frequency of the trigger. For example, only the trigger that reaches the preset duration, such as three, four or five seconds, is for generating a one time password, otherwise is for inquiring a one time password. Or the trigger that reaches the preset frequency, such as two or three times per preset cycle, is for generating a one time password, otherwise is for inquiring a one time password. By doing this, only the trigger that reaches the preset duration or frequency is for generating a one time password, thereby reducing the mis-trigger times. Also, because the simple inquiry operation is similar to the mis-trigger one, only the one time password generated last time will be displayed and no one time password is generated when the token is mis-triggered under a special condition, thereby eliminating the asynchronous probability between a host and a one time password token.

In step 103, if a result of the determining step is an inquiry operation, go on determining whether there is a one time password stored in the token, if so, go to step 104; otherwise, go to step 106.

The reason for determining whether there is a one time password stored in the token or not is that there is not a one time password stored in a new token which is triggered for a first time.

In step 104, if there is a one time password stored in the token, display the stored password.

In step 105, generate a one time password and display and store it in the token.

The token uses built-in one time password generating algorithm in combination with a time and/or an event factor to generate a one time password.

In step 106, display error information.

The "error" means no one time password is stored in the token, therefore a user can trigger to generate one, and display and store it.

Embodiment 2

Figure 2:
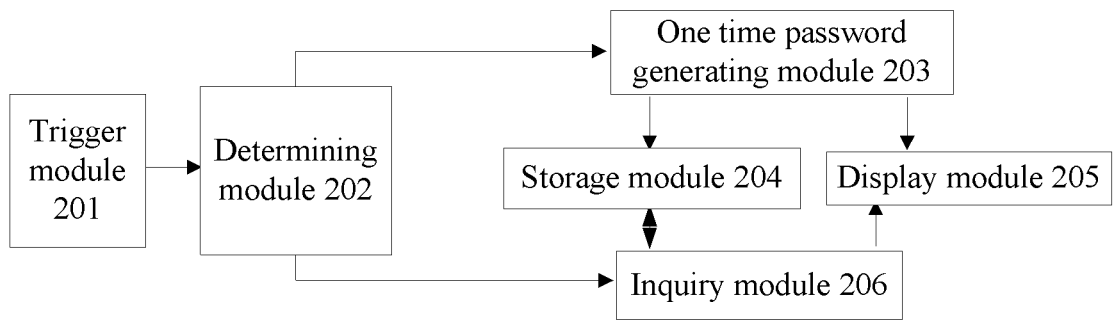
FIG. 2 is a structure view of the one time password token with inquiry function of the invention.

As shown in FIG. 2, the embodiment 2 discloses a one time password token with inquiry function, including a trigger module 201, a determining module 202, a one time password generating module 203, a storage module 204, a display module 205, an inquiry module 206 and a power supply module.

The trigger module 201, the one time password generating module 203 and the inquiry module 206 are respectively connected to the determining module.

Both the storage module 204 and the display module 205 are connected to the one time password generating module 203 and the inquiry module 206.

In the token, the trigger module 201 is for generating a trigger signal to enable the determining module 202, and the trigger module 201 can be a trigger means, including a key, a button, a sensor or a switch.

The determining module 202 is for determining whether a trigger from the trigger module 201 is a generation or an inquiry operation, and for enabling the one time password generating module 203 or the inquiry module 206 based on a determining result. Specifically, the determining module 202 determines whether the trigger is a generation or an inquiry operation according to duration or frequency of the trigger after the trigger module 201 is triggered. If the trigger module 201 has been triggered for a preset duration, such as three, five or six seconds, a one time password will be generated; otherwise, a one time password stored will be inquired; or if the trigger module 201 is triggered at a preset frequency, for example, it is triggered continuously for two or three times per preset cycle, a one time password will be generated; otherwise, a one time password stored will be inquired.

The one time password generating module 203 is for generating a one time password based on a determining result of the determining module 202.

The storage module 204 is for storing the one time password generated by the one time password generating module 203.

The display module 205 is for displaying the one time password generated by the one time password generating module 203 and for displaying a one time password according to an inquiry result of the inquiry module 206, and the display module 205 includes a segment-code screen, a dot-matrix screen, a character screen or an image screen, etc.

The inquiry module 206 is for inquiring the one time password in the storage module 204 according to a determining result of the determining module 202.

The power supply module is for supplying power for the one time password token.

In this embodiment, the token further includes a control module for controlling the display module 205 to display error information when the inquiry module 206 finds no one time password stored in the storage module 204. Then, a user can generate a one time password when the inquiry module 206 finds no one time password stored in the storage module 204, and the one time password is displayed and stored.

By doing this, the token is of advantages as reducing the number of times for which the token is mis-triggered because a one time password will be generated only when the preset duration and frequency is reached. Also, because the simple inquiry operation is similar to the mis-trigger one, only the one time password generated last time will be displayed and no one time password is generated when the token is mis-triggered under a special condition, thereby eliminating the asynchronous probability between a host and a one time password token.

Embodiment 3

Figure 3:
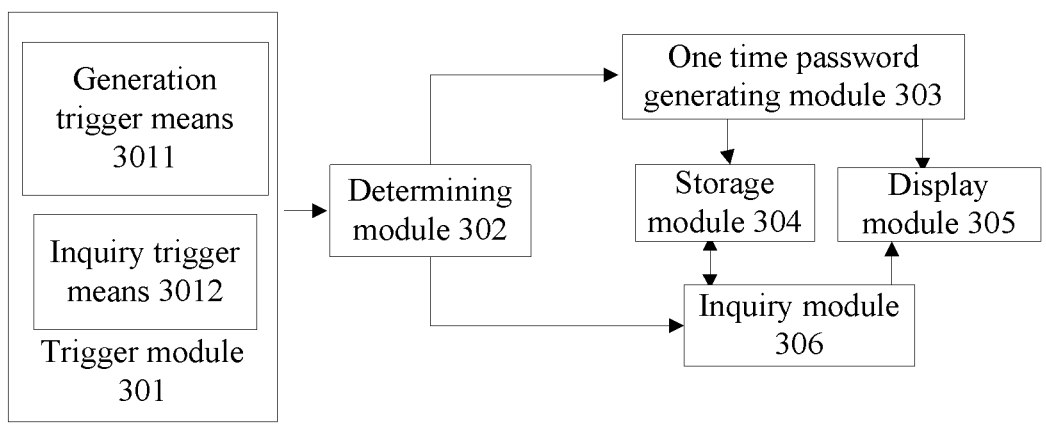
FIG. 3 is a structure view of the one time password token with an inquiry function of the invention.

As shown in FIG. 3, the embodiment 3 discloses a one time password token with inquiry function, including a trigger module 301, a determining module 302, a one time password generating module 303, a storage module 304, a display module 305, an inquiry module 306 and a power supply module.

The trigger module 301, the one time password generating module 303 and the inquiry module 306 are respectively connected to the determining module 302.

Both the storage module 304 and the display module 305 are connected to the one time password generating module 303 and the inquiry module 306.

The trigger module 301 is comprised of a generation trigger means 3011 and an inquiry trigger means 3012.

The generation trigger means 3011 is for generating a trigger signal to enable the determining module 302 to start the one time password generating module 303 to generate a one time password.

The inquiry trigger means 3012 is for generating a trigger signal to enable the determining module 302 to start the inquiry module 306 to inquiry a one time password.

The trigger means can be a key, a button, a sensor or a switch.

The determining module 302 is for determining whether a trigger from the trigger module 301 is a generation or an inquiry operation, and for enabling the one time password generating module 303 or the inquiry module 306 according to a determining result.

The one time password generating module 303 is for generating a one time password based on a determining result of the determining module 302.

The storage module 304 is for storing a one time password generated by the one time password generating module 303.

The display module 305 is for displaying a one time password generated by the one time password generating module 303 and for displaying a one time password according to an inquiry result of the inquiry module 306, and the display module 305 includes a segment-code screen, a dot-matrix screen, a character screen or an image screen.

The inquiry module 306 is for inquiring a one time password in the storage module 304 according to a determining result of the determining module 302.

The power supply module is for supplying power for the one time password token.

In this embodiment, the generation trigger means 3011 can apply a different structure from the inquiry trigger means 3012, for example, the generation trigger means 3011 can be equipped with a small size, in a deep position, which is not easy to be mis-triggered, while the inquiry trigger means can be equipped with a large size, in a swallow position. As a result, a mis-trigger operation is turned into an inquiry operation, thereby reducing the asynchronous problem between a one time password token and a server.

In this embodiment, the one time password token further includes a control module for controlling the display module 305 to display error information when the inquiry module 306 finds no one time password stored in the storage module 306. Then, a user can generate a one time password when the inquiry module 306 finds no one time password stored in the storage module 304, and the one time password is displayed and stored.

The above mentioned are only preferred embodiments of the invention, not a limitation to the invention. Any modification, equivalent substitutions, and improvement made to the invention within the spirit and principle of the invention shall fall into the protection scope of the invention.

What is claimed is:

1. A one time password inquiry method, comprising steps of:

triggering a one time password token device with a trigger;

determining whether the trigger is an inquiry operation or a generation operation, wherein the inquiry operation retrieves a one time password stored in a storage on the one time password token device and displaying on the one time password token device the retrieved one time password from the storage and wherein the generation operation generates a one time password on the one time password token device and storing the generated one time password in the storage on the one time password token device and displaying the generated one time password on the one time password token device; and wherein the step of triggering the one time password token device is executed by a trigger means on the one time password token device, and the trigger means comprises two separate trigger means based on either a duration or a frequency of the trigger, one for generating the one time password and one for inquiring the one time password stored in the one time password token device;

wherein the inquiry operation includes inquiring if the one time password token is stored in the storage on the one time password token device and if the one time password is not in the storage on the one time password token device, the one time token password token device displays error information; otherwise, displaying the stored one time password on the one time token password token device.

2. The method of claim 1, wherein the step of determining whether the trigger is an inquiry or a generation operation is executed in accordance with a preset rule.

3. The method of claim 2, wherein the preset rule is a duration or a frequency of the trigger.

4. The method of claim 1, wherein the trigger means is a key, a button, a sensor or a switch.

5. A one time password token device with an inquiry function, the token device comprising:
a trigger module,
a determining module,
a one time password generating module,
a storage module,
a display module, and
an inquiry module, wherein:
the trigger module, the determining module and the one time password generating module and the inquiry module are implemented by a processor contained in the token device, and
the trigger module, the one time password generating module and the inquiry module are respectively connected to the determining module;
both the storage module and display module are connected to the one time password generating module and the inquiry module;
the trigger module is configured to generate a trigger signal to enable the determining module;
the determining module is configured to determine whether the trigger signal generated by the trigger module is a generation signal or an inquiry signal based on a duration or frequency of the trigger signal, and the determining module enables the one time password generating module for the generation signal and enables the inquiry module for the inquiry signal;
the one time password generating module is configured to generate a one time password by performing a generation operation when the determining module determines that the trigger signal is the generation signal;
the storage module is configured to store the one time password generated by the generation operation performed by the one time password generating module;
the display module is configured to display the one time password generated by the one time password generating module and the one time password inquired by the inquiry module; and
the inquiry module is configured to inquire the one time password stored in the storage module by performing an inquiry operation when the determining module determines that the trigger signal is the inquiry signal to retrieve the one time password from the storage module; and
the trigger module comprises two separate trigger means, one for generating the one time password and one for inquiring the one time password stored in the storage module, respectively,
wherein the inquiry operation includes inquiring if the one time password token is stored in the storage module and if the one time password is not stored in the storage module, the display module displays error information; otherwise, the display module displays the one time password stored in the storage module.

6. The one time password token device of claim 5, further comprises a control module implemented by the processor for controlling the display module to display error information when the inquiry module finds no one time password in the storage module.

7. The one time password token device of claim 6, wherein the determining module is for determining whether a trigger from the trigger means is a generation or an inquiry operation according to duration or frequency of the trigger.

8. The one time password token device of claim 6, wherein the trigger means is a key, a button, a sensor or a switch.

9. The one time password token device of claim 5, wherein the display module is a display means, comprising a segment-code screen, a dot-matrix screen, a character screen or an image screen.

* * * * *